(12) United States Patent
Lannuzel et al.

(10) Patent No.: US 10,730,979 B2
(45) Date of Patent: Aug. 4, 2020

(54) FUNCTIONALISED FLUORINATED COPOLYMERS

(71) Applicants: Arkema France, Colombes (FR); Centre National de la Recherche Scientifique, Paris (FR); Universite de Montpellier, Montpellier (FR); Ecole Nationale Superieure de Chimie de Montpellier, Montpellier (FR)

(72) Inventors: Thierry T. Lannuzel, Villeurbanne (FR); Fabrice Domingues Dos Santos, Paris (FR); Thibaut Soulestin, Lyons (FR); Vincent Ladmiral, Montpellier (FR); Bruno Ameduri, Montpellier (FR)

(73) Assignee: Arkema France, Colombes (FR)

( * ) Notice: Subject to any disclaimer, the term of this patent is extended or adjusted under 35 U.S.C. 154(b) by 46 days.

(21) Appl. No.: 15/769,275

(22) PCT Filed: Oct. 18, 2016

(86) PCT No.: PCT/FR2016/052687
§ 371 (c)(1),
(2) Date: Apr. 18, 2018

(87) PCT Pub. No.: WO2017/072427
PCT Pub. Date: May 4, 2017

(65) Prior Publication Data
US 2018/0312618 A1 Nov. 1, 2018

(30) Foreign Application Priority Data

Oct. 29, 2015 (FR) .................................... 15 60355
Jun. 9, 2016 (FR) .................................... 16 55305

(51) Int. Cl.
| | | |
|---|---|---|
| *C08F 214/22* | (2006.01) | |
| *C08F 8/22* | (2006.01) | |
| *C08F 8/30* | (2006.01) | |
| *C08F 8/40* | (2006.01) | |
| *C08F 216/14* | (2006.01) | |
| *C09D 127/16* | (2006.01) | |

| | | |
|---|---|---|
| *C09D 127/22* | (2006.01) | |
| *C09D 127/24* | (2006.01) | |

(52) U.S. Cl.
CPC ............ *C08F 214/227* (2013.01); *C08F 8/22* (2013.01); *C08F 8/30* (2013.01); *C08F 8/40* (2013.01); *C08F 214/22* (2013.01); *C08F 216/1408* (2013.01); *C09D 127/16* (2013.01); *C09D 127/22* (2013.01); *C09D 127/24* (2013.01); *C08F 2800/10* (2013.01)

(58) Field of Classification Search
CPC . C08F 214/227; C08F 214/24; C08F 214/247
See application file for complete search history.

(56) References Cited

U.S. PATENT DOCUMENTS

| 4,581,412 | A | * | 4/1986 | Ohmori | ................. C07C 17/275 525/199 |
| 4,667,000 | A | * | 5/1987 | Ohmor | ................. C08F 214/227 525/326.3 |
| 5,079,320 | A | * | 1/1992 | Kappler | .............. C08F 214/227 526/249 |
| 6,281,812 | B1 | | 8/2001 | Enokida et al. | |
| 6,369,178 | B1 | * | 4/2002 | McCarthy | ............. C08F 214/04 526/242 |
| 2014/0357821 | A1 | | 12/2014 | Zhao et al. | |

FOREIGN PATENT DOCUMENTS

| EP | 0 135 917 A2 | 4/1985 |
| EP | 0 190 654 A2 | 8/1986 |
| JP | 61 219780 | 9/1986 |
| JP | 2000-313839 | * 11/2000 |

OTHER PUBLICATIONS

Translation of JP 2000-313839 (2000) (Year: 2000).*

* cited by examiner

*Primary Examiner* — Robert C Boyle
(74) *Attorney, Agent, or Firm* — Joanne Rossi

(57) ABSTRACT

The invention relates to a fluorinated copolymers which are particularly based on vinylidene fluoride (VDF) or trifluoroethylene (TrFE) and particularly functionalized by functional and/or functionizable vinyl ethers. The invention also relates to methods for producing said copolymers, and to the applications thereof.

19 Claims, 9 Drawing Sheets

FUNCTIONALISED FLUORINATED COPOLYMERS

This application claims benefit, under U.S.C. § 119 or § 365 of PCT Application Number PCT/FR2016/052687, filed Oct. 18, 2016, and French Patent Applications Number FR1560355, filed Oct. 29, 2015, and Number FR1655305, filed Jun. 9, 2016, these documents being incorporated herein by reference.

FIELD OF THE INVENTION

The present invention relates to fluorinated copolymers, in particular based on vinylidene fluoride (VDF) and/or on trifluoroethylene (TrFE), which are functionalized in particular by functional and/or functionalizable vinyl ethers, to processes for producing these copolymers and also to the applications thereof.

TECHNICAL BACKGROUND

Fluoropolymers represent a class of compounds with noteworthy properties for a large number of applications, from paint or special coatings to sealing joints, via optics, microelectronics, energy such as photovoltaics, fuel cells and Li-Ion batteries, and membrane technology. Among these fluoropolymers, poly(vinylidene fluoride) (PVDF) is a polymer acknowledged for its chemical and heat stability. This polymer is prepared by radical polymerization from vinylidene fluoride (VDF). This fluorinated monomer is difficult to copolymerize with non-fluorinated monomers such as vinyl ethers, acrylates, methacrylates or styrenes. In order to improve certain properties of PVDF, such as adhesion, anti-corrosion of coatings, hydrophobicity or hydrophilicity, while at the same time retaining its properties, in particular of chemical and heat resistance, it is necessary to functionalize it by incorporating monomers bearing chemical functions. However, few functionalized PVDFs are known, because of the low number of functionalized or functionalizable monomers capable of satisfactorily copolymerizing with VDF.

Another known fluoropolymer, poly(trifluoroethylene), shares the same difficulties in terms of being functionalized, since trifluoroethylene (TrFE) is itself difficult to copolymerize with functional monomers such as vinyl ethers, acrylates, methacrylates and styrenes for example.

There is therefore a need to develop new fluorinated copolymers, in particular copolymers based on VDF and/or TrFE, which exhibit functionalities that make them suitable for applications that are more varied than those which are known, while at the same time keeping the specific properties provided by the fluorinated monomer.

Chlorotrifluoroethylene (CTFE) copolymerizes easily with other fluorinated monomers such as VDF or TrFE, but also with non-fluorinated monomers, in particular with vinyl ethers. The publication by Boschet F. and Améduri B. in *Chem Rev,* 2014, 114, 927-980 describes in detail the various known CTFE-based copolymers, which are classified in two categories: i) copolymers having a low proportion of comonomer, their properties being close to those of poly (chlorotrifluoroethylene) with regard to the thermoplastic nature and the high degree of crystallinity; and ii) copolymers containing electron-donor comonomers, said copolymers being obtained by a polymerization reaction of acceptor-donor type giving predominantly alternating structures. Among the latter category are alternating copolymers of formula poly(CTFE-alt-vinyl ethers), which are prepared by radical polymerization. At the current time, many alternating copolymers of this type have been prepared, in which said vinyl ether (VE) is an alkyl vinyl ether of formula $CH_2=CH-O-R$ in which R can be for example chosen from the following groups: alkyl, such as ethyl, butyl, isobutyl, 4-hydroxybutyl, 2-chloroethyl, 2-ethylhexyl, 2-hydroxyethyl, glycidyl, 3-chloro-(2,2-dimethylpropyl). Said vinyl ether can also be further functionalized with for example imidazole, carbonate or phosphonate groups in a step subsequent to the polymerization. In the abovementioned alternating copolymers, the CTFE:VE molar ratio is close to 1.

The present invention proposes providing novel functionalized fluorinated copolymers, in particular copolymers of VDF and/or TrFE functionalized by the regular incorporation into the polymer chain of triads (X-E-X) where X is a fluorinated monomer having at least one double bond which has an electron acceptor nature, that is to say which is electron-depleted, X being, on the one hand, copolymerizable with a fluorinated monomer such as VDF or TrFE, and, on the other hand, copolymerizable with a monomer E having at least one double bond which has an electron donor nature, that is to say which is electron-enriched, and comprising a functional or functionalizable group. Said triad is for example formed from chlorotrifluoroethylene (monomer X) and vinyl ethers (monomer E): (CTFE-VE-CTFE).

SUMMARY OF THE INVENTION

The invention relates first and foremost to a fluorinated copolymer of formula (I) below:

$$poly[A_a\text{-co-}(X\text{-}E\text{-}X)_b] \qquad (I)$$

in which A is a fluorinated monomer, X is a fluorinated monomer having at least one double bond which has an electron acceptor nature, X is capable of copolymerizing with, on the one hand, said monomer A and, on the other hand, with a monomer E in an alternating manner, E being a monomer bearing a functional or functionalizable group having at least one double bond which has an electron donor nature. The indices a and b represent the molar ratios of monomer A and of triad X-E-X, respectively.

Said monomer is A and X copolymerize with one another.

Said monomer E does not copolymerize with said fluorinated monomer A.

Characteristically, the X:E molar ratio in the copolymer is greater than or equal to 2, preferably being equal to 2.

Characteristically, a is greater than 0.85, preferably greater than 0.90 and advantageously greater than 0.95.

Characteristically, b is less than 0.15, preferably less than 0.10, advantageously less than 0.05 and greater than 0.

According to one embodiment, said fluorinated monomer A is vinylidene fluoride (VDF).

According to one embodiment, said fluorinated monomer A is trifluoroethylene (TrFE).

According to another embodiment, said fluorinated monomer A is a mixture of VDF and TrFE, the copolymer according to the invention thus comprising a poly[VDF-co-TrFE-co-(X-E-X)] copolymer containing the triad (X-E-X).

According to one embodiment, said monomer E bears one or more functional groups that may be, independently, for example: an acid or derivatives thereof such as phosphonic acids and phosphonates, and carboxylic acids and the esters derived therefrom, a halogen (such as chlorine, bromine or iodine), an azide, an alkyne, an alcohol, a thiol, an epoxy, a carbonate, a silane such as triethoxysilane, a sulfonate, a silicone, a tertiary amine, an aldehyde, a saccharide, a fluoropolymer or a hydrocarbon-based polymer.

According to another embodiment, said monomer E is an alkyl vinyl ether which will be functionalized once the copolymer of formula (I) has been obtained.

A subject of the invention is also a process for producing the copolymer of formula (I), comprising a step of radical copolymerization of a reaction mixture comprising the fluorinated monomer A, the monomer X and the monomer E.

For the case where said monomer F does not bear the desired function, the process according to the invention comprises an additional step of functionalization of said monomer E, which is then referred to as functionalizable monomer.

A subject of the invention is also functional copolymers based on VDF and/or on TrFE for applications in membranes, paints, coatings and varnishes, electroactive devices, energy, packaging.

DESCRIPTION OF EMBODIMENTS OF THE INVENTION

Figure 1:
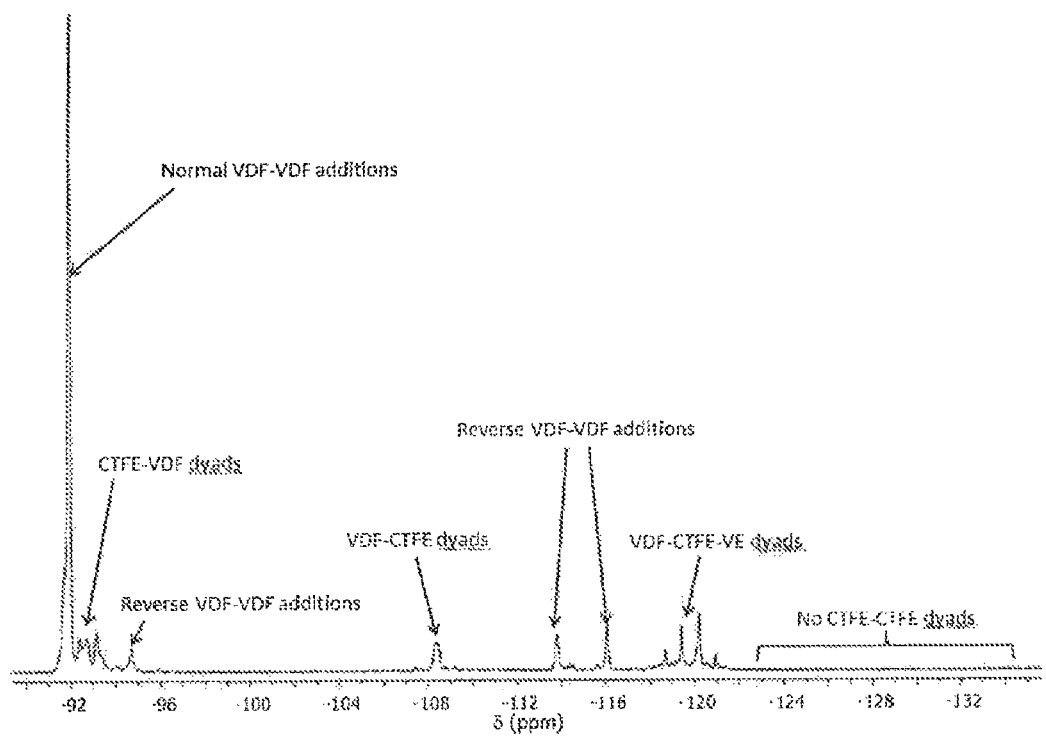
FIG. 1 represents a $^{19}$F NMR spectrum of the poly[VDF-co-(CTFE-CEVE-CTFE)] copolymer in DMSO $d_6$ at 20° C. synthesized by virtue of the process described in example 1.

The invention is now described in greater detail and in a nonlimiting manner in the description which follows.

A subject of the invention is a fluorinated copolymer of formula (I) below:

$$\text{poly}[A_a\text{-co-}(X\text{-}E\text{-}X)_b] \quad (I)$$

in which A is a fluorinated monomer, X is a fluorinated monomer having a double bond which has an electron acceptor nature, X is capable of copolymerizing with, on the one hand, said monomer A and, on the other hand, with a monomer E in an alternating manner. E being a monomer bearing a functional or functionalizable group having a double bond which has an electron donor nature. The indices a and b represent, respectively, the molar ratios of monomer A and of triad X-E-X.

Said monomers A and X copolymerize with one another.

Said monomer E does not copolymerize with said fluorinated monomer A.

Said monomer E, the reactive double bond of which has an electron donor nature, comprises at least one functional or functionalizable group that can be, for example: an acid or derivatives thereof such as phosphonic acids, alkyl phosphonates, sulfonic acids, sulfonates, carboxylic acids and the esters derived therefrom, a halogen, an azide, an alkyne, an alcohol, a thiol, an epoxy, a carbonate, a silane such as triethoxysilane, a silicone, a tertiary amine, an aldehyde, a saccharide, a fluoropolymer or a hydrocarbon-based polymer.

Characteristically, the X:E molar ratio in the copolymer is greater than or equal to 2, preferably being equal to 2.

Characteristically, a is greater than 0.85, preferably greater than 0.90 and advantageously greater than 0.95.

Characteristically, b is less than 0.15, preferably less than 0.10, advantageously less than 0.05 and greater than 0.

According to one embodiment, when the X:E ratio is greater than 2, the copolymer according to the invention is a poly[A-co-X-co-(X-E-X)] copolymer. The term "copolymer" should be understood as covering any polymer comprising at least two different types of repeating moieties. The term "copolymerization" means any polymerization reaction involving at least two different types of monomers.

According to one embodiment, said fluorinated monomer A is vinylidene fluoride (VDF).

According to one embodiment, said fluorinated monomer A is trifluoroethylene (TrFE).

According to one embodiment, said fluorinated monomer A consists of a mixture of VDF and TrFE.

According to another embodiment, said fluorinated monomer A is a mixture of VDF and TrFE, the copolymer according to the invention thus comprising a poly(VDF-co-TrFE) copolymer containing the triad (X-E-X).

According to one embodiment, said fluorinated monomer X is chosen from fluorinated monomers having a reactive double bond which has an electron acceptor nature, such as: chlorofluoroethylene (CFE), chlorotrifluoroethylene (CTFE), hexafluoropropene (HFP), vinyl fluoride (VF), tetrafluoroethylene (TFE), tetrafluoropropenes, hexafluorobutenes, perfluorobutadiene, perfluorobutene, perfluorovinyl ethers, such as perfluoro(methyl vinyl) ether (PMVE), perfluoro(propyl vinyl) ether (PPVE), pentafluoropropene (PFP), perfluoro(4-methyl-3,6-dioxaoct-7-ene) sulfonyl fluoride (PFSVE) or 2-(trifluoromethyl)acrylic acid and its ester derivatives.

According to one embodiment, said monomer E, the reactive double bond of which has an electron donor nature, is an alkyl vinyl ether of formula $CH_2=CH-O-R$ in which R can for example be chosen from the following groups: alkyls, such as ethyl, butyl, iso-butyl, 2-ethylhexyl or tert-butyl; alcohols, such as 4-hydroxybutyl or 2-hydroxyethyl; glycerol, saccharide (hexoses and pentoses); halogenated groups, such as 2-chloroethyl or chloro-(2,2-dimethylpropyl); thiols, silanes, acids, azides, alkynes, epoxy, carbonates, amines, ammoniums, amidine, aldehyde, isocyanate, urea, carboxylates, sulfonates, phosphonates, silicones, fluorinated or hydrocarbon-based polymers and oligomers.

According to one embodiment, said monomer E bears a functional group (G in the diagram below) that can be, for example: an acid or derivatives thereof such as phosphonic acids, alkyl phosphonates, sulfonic acids, sulfonates, carboxylic acids and the esters derived therefrom, a halogen, an azide, an alkyne, an alcohol, a thiol, an epoxy, a carbonate, a silane such as triethoxysilane, a sulfonate, a silicone, a tertiary amine, an aldehyde, a saccharide, a fluoropolymer or a hydrocarbon-based polymer.

According to one embodiment, the copolymer according to the invention is a functional copolymer containing VDF or TrFE or else a mixture of VDF and of TrFE, CTFE (monomer X) and a functional or functionalizable vinyl ether (monomer E) which can bear a functional group ("G" in the diagram below) that can be, for example, an acid and derivatives thereof such as phosphonic acids, phosphonates and carboxylic acids, a halogen, an azide, an alkyne, an alcohol, a thiol, an epoxy, a carbonate, a silane such as triethoxysilane, a sulfonate, a silicone, a tertiary amine, an aldehyde, a saccharide, a fluoropolymer or a polymer as illustrated in the diagram below:

According to one embodiment, this copolymer has the following composition (in moles):
  a proportion of moieties derived from vinylidene fluoride (VDF) and/or trifluoroethylene (TrFE) monomers of greater than 85%, preferably greater than 90%, advantageously greater than 95%;
  a proportion of moieties derived from the chlorotrifluoroethylene-vinyl ether-chlorotrifluoroethylene triad of less than 15%, preferably less than 10%, advantageously less than 5%;
  a proportion of moieties derived from the vinyl ether monomer of less than 5%, preferably less than 2%, advantageously less than 1%, and greater than or equal to 0.1%;
  an X:E, chlorotrifluoroethylene:vinyl ether, molar ratio of greater than or equal to 2, preferably equal to 2.

According to one embodiment, the copolymer according to the invention is a copolymer containing VDF (monomer A), CTFE (monomer X) and a vinyl ether (monomer E).

According to one embodiment, the copolymer according to the invention is a copolymer containing TrFE (monomer A), CTFE (monomer X) and a vinyl ether (monomer E).

According to one embodiment, the copolymer according to the invention is a copolymer containing a mixture of VDF and of TrFE (monomer A), CTFE (monomer X) and a vinyl ether (monomer E).

According to a first embodiment, the vinyl ethers bear the desired function before the polymerization with the other monomers which are part of the composition of the copolymer according to the invention, so that a functionalized copolymer which does not need to undergo additional chemical modifications is obtained. This copolymer can however be modified as required, in particular in order to crosslink it.

According to another embodiment, said monomer E is an alkyl vinyl ether which will be functionalized once the copolymer of formula (I) has been obtained.

In these two embodiments, the vinyl ethers (VEs) can in particular be functionalized by:
  phosphonic acid functions in order to improve the properties of adhesion and anti-corrosion of coatings;
  poly(ethylene glycol), PEG, side chains for the conduction of lithium ions in Li-Ion batteries;
  other chemical functions allowing crosslinking of the polymer. The degree of crosslinking is then controlled by the amount of VEs introduced. The crosslinking of the copolymer makes it possible in particular to render it insoluble.

In particular, in the first embodiment above, the copolymer can be crosslinked either by converting the function borne by the vinyl ether into a function which allows for example radical crosslinking or photo-crosslinking of the copolymer or crosslinking thereof by nucleophilic substitution or polyaddition, or by directly reacting the copolymer with a polyfunctional crosslinking agent.

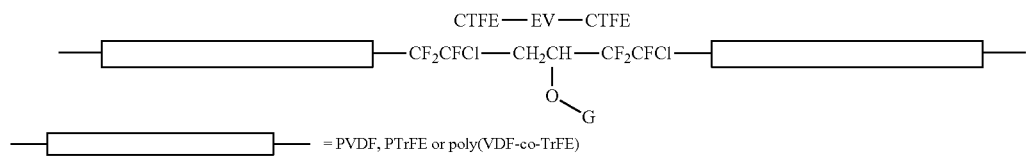

Thus, in the case where use is made of a vinyl ether bearing a chlorine atom (such as 2-chloroethyl vinyl ether or CEVE), the copolymer obtained from this monomer can be modified by iodination (Finkelstein reaction) with sodium iodide, as illustrated in the diagram below and in example 2:

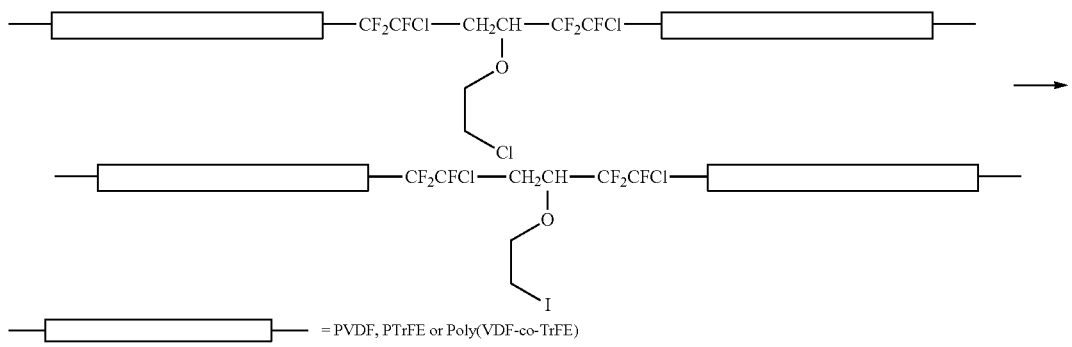

The iodinated copolymer obtained, of formula poly[VDF-co-(CTFE-IEVE-CTFE)], can be subjected to a radical crosslinking, for example in the presence of triallyl isocyanurate (TAIC) and of a radical initiator, or to a crosslinking by nucleophilic substitution of the iodine. As a variant, the iodinated copolymer can undergo an azidation reaction, resulting in a copolymer of formula poly[VDF-co-(CTFE-N$_3$EVE-CTFE)], as illustrated in the diagram below and in example 5:

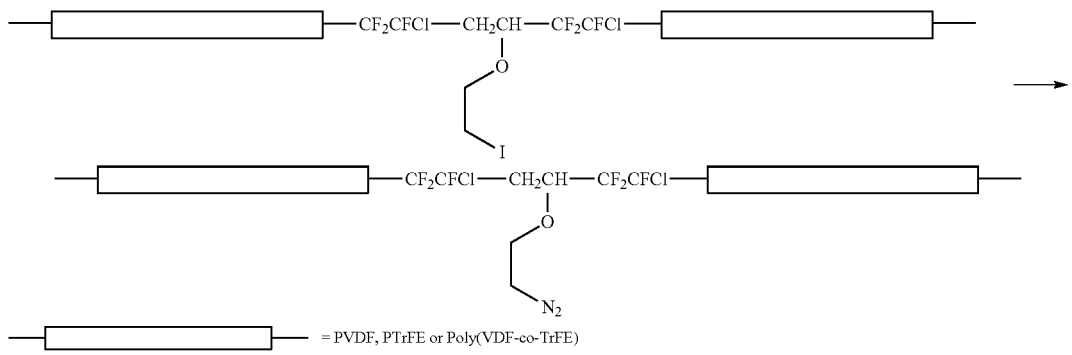

This modified copolymer can then be crosslinked by cycloaddition, by reacting it for example with a polyalkyne or a polynitrile.

According to another possibility, the iodinated copolymer described above can be reacted with a phosphite (such as triethylphosphite) by an Arbuzov reaction, so as to form the copolymer poly[VDF-co-(CTFE-DEVP-CTFE)], bearing a diethyl vinyl phosphonate (DEVP) function, as illustrated in the diagram below and in example 3:

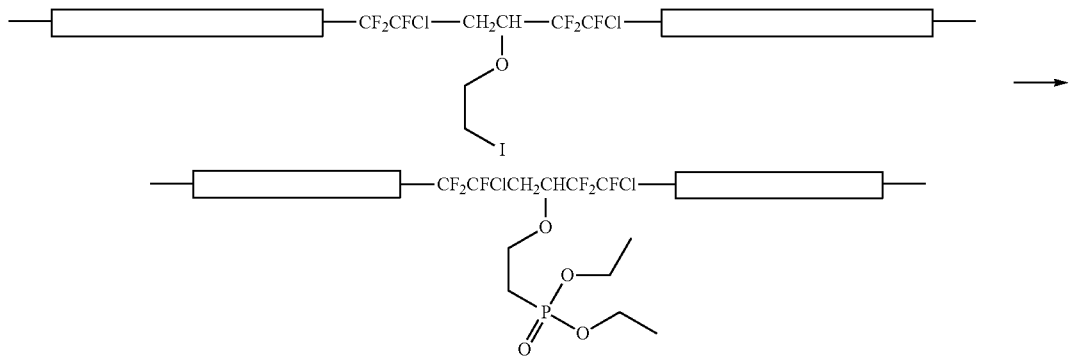

-continued

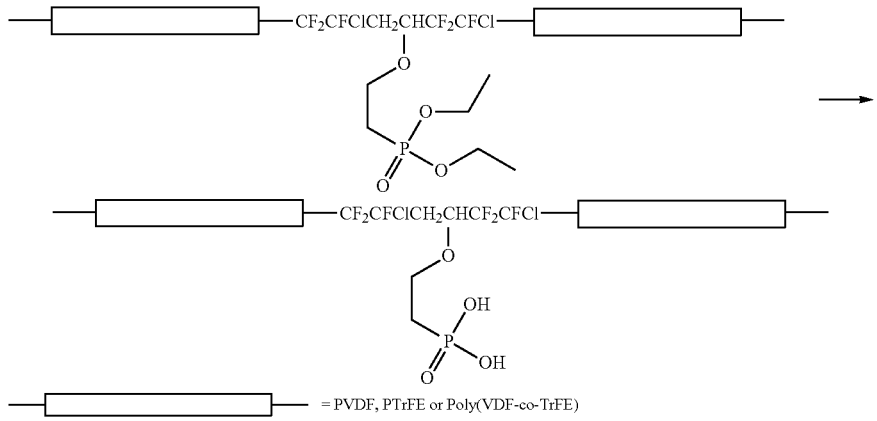
= PVDF, PTrFE or Poly(VDF-co-TrFE)

The copolymer thus obtained will form, by hydrolysis, a phosphonated derivative of formula poly[VDF-co-(CTFE-VPA-CTFE)], bearing a vinyl phosphonic acid (VPA) function, as illustrated in the diagram below and in example 4:

The copolymerization reaction is carried out in the presence of a radical initiator. Said initiator may be, for example, tert-butyl peroxypivalate (or TBPPI), tert-amyl peroxypivalate, peroxydicarbonates such as bis(4-tert-butylcyclohexyl) peroxydicarbonate, sodium, ammonium or potassium persulfate, benzoyl peroxide and its derivatives, tert-butyl hydroperoxide, tert-butyl peroxide or 2,5-bis(tert-butylperoxy)-2,5-dimethylhexane.

The introduction of VEs bearing acid functions, such as a phosphonic acid, improves the adhesion of PVDF to various substrates, such as metal substrates.

As a variant, the vinyl ether used in the preparation of the copolymer according to the invention can have a function allowing the grafting of a polymerizable group such as an allyl or (meth)acryloyl group. It can in particular be a hydroxyl function capable of reacting, once the copolymer is formed, with an isocyanate functionalized by a polymerizable group, as illustrated in example 7. After this grafting step, the copolymer can be crosslinked using thermal radical initiators or photoinitiators, optionally in the presence of a crosslinking co-agent.

As a further variant, the vinyl ether used in the preparation of the copolymer according to the invention can bear a function, in particular a hydroxyl or epoxy function, capable of forming covalent bonds with a polyfunctional crosslinking agent, such as a dicarboxylic acid, a diepoxy or a diisocyanate (in the case of a vinyl ether bearing a hydroxyl function, such as 2-hydroxyethyl vinyl ether) or else a diol or a diamine (in the case of a vinyl ether bearing an epoxy function, such as glycidyl vinyl ether). Such a crosslinking process is in particular illustrated in example 8.

A subject of the invention is also a process for producing the copolymer of formula (I), mentioned above, comprising a step of radical copolymerization of a reaction mixture comprising the fluorinated monomer A, the monomer E and the monomer X, in the following molar ratios: X:E greater than or equal to 2, preferably equal to 2; a greater than or equal to 0.85, preferably greater than 0.90 and advantageously greater than 0.95, and b less than 0.15, preferably less than 0.10, advantageously less than 0.05 and greater than 0.

The polymerization reaction is carried out according to a radical polymerization process in solution, in suspension or in emulsion, in the presence of a radical initiator, of a solvent, optionally of a chain transfer agent and optionally of a dispersing agent or of a surfactant.

According to one embodiment, the copolymerization can be carried out in the presence of a dispersing agent. This can for example be a water-soluble cellulose-based derivative, such as alkyl celluloses or alkyl and hydroxyalkyl celluloses, a paraffin, or polyvinyl alcohols.

According to one embodiment, the copolymerization can be carried out in the presence of a chain transfer agent which makes it possible to adjust the molar mass of the copolymer. The adjustment of the molar mass makes it possible in particular to facilitate the processing of the copolymer. These molar mass adjusters can for example be alkyl acetates such as ethyl acetate, dialkyl carbonates such as diethyl carbonate, ketones such as 2-butanone, thiols, alkyl halides, disulfides, saturated alcohols such as isopropanol and alkanes such as propane.

According to a first embodiment, the poly[$A_a$-co-(CTFE-EV-CTFE)$_b$] copolymer is prepared by means of a radical solution polymerization process, comprising a step of copolymerization of a reaction mixture of vinylidene fluoride and/or of trifluoroethylene, of chlorotrifluoroethylene and of a functionalizable or functionalized vinyl ether, in the presence of a radical initiator and of a solvent.

According to one embodiment:
the molar proportion of VDF and/or of TrFE, in the reaction mixture, is greater than 85%, preferably greater than 90%, advantageously greater than 95%;
the proportion of VE is less than 5%, preferably less than 2%, advantageously less than 1%, and greater than or equal to 0.1%;
the X:E, chlorotrifluoroethylene:vinyl ether, molar ratio is greater than or equal to 2, preferably equal to 2;
the molar proportions being related to the sum of moles of VDF, of TrFE, of CTFE and of VE.

According to one embodiment, the reaction mixture consists essentially of, and preferably consists of, a mixture of VDF and/or of TrFE, of CTFE and of VE, of radical initiator and of solvent.

The reaction is performed in a solvent which is chosen, for example, from 1,1,1,3,3-pentafluorobutane, acetonitrile, methyl ethyl ketone, dimethyl carbonate, 2,2,2-trifluoroethanol, hexafluoroisopropanol, tert-butanol, methyl acetate, ethyl acetate, cyclohexanone and water, and mixtures thereof.

According to one embodiment, the reaction mixture is heated up to a reaction initiation temperature of between 30 and 100° C. and preferably between 40 and 80° C. The initial pressure inside the autoclave varies according to the solvent, the reaction temperature and the amount of monomers. It is generally between 0 and 80 bar. The choice of the optimum temperature depends on the initiator that is used. Generally, the reaction is performed for at least 6 hours, at a temperature at which the half-life time of the initiator is between 1 and 10 hours.

According to one preferred embodiment, the molar proportion of VDF and/or TrFE (monomer A) moieties in the copolymer is greater than 85%, preferably greater than 90%, advantageously greater than 95%.

According to one preferred embodiment, the molar proportion of moieties derived from the CTFE-VE-CTFE triad in the copolymer is less than 15%, preferably less than 10%, advantageously less than 5%.

According to one embodiment, the molar proportion of moieties derived from the VE monomer is less than 5%, preferably less than 2%, advantageously less than 1%, and greater than or equal to 0.1%.

According to one preferred embodiment, the CTFE:VE molar ratio is greater than or equal to 2, preferably equal to 2.

The molar mass of the poly[$A_a$-co-(CTFE-VE-CTFE)$_b$] copolymer obtained by solution polymerization is preferably from 5000 to 150 000 g/mol, more preferentially from 10 000 to 100 000 g/mol.

According to another embodiment, the poly[$A_a$-co-(CTFE-VE-CTFE)$_b$] copolymer is prepared by means of a radical suspension polymerization process, comprising a step of copolymerization of a reaction mixture of VDF and/or of TrFE, of CTFE and of VE, in the presence of water, of a radical initiator, optionally of a dispersing agent and optionally of a chain transfer agent.

The suspension process makes it possible to avoid the use of toxic solvents and of fluorinated surfactants (of the bioaccumulatable, toxic and persistent PFOA or PFOS type) during the synthesis and the purification of the copolymer.

In the suspension process, the VDF and/or the TrFE, the CTFE and the VE are charged to a stirred reactor filled with deionized water, optionally a dispersing agent and optionally a chain transfer agent.

The reactor is then brought to the desired initiation temperature, this temperature being maintained during the polymerization at a value generally between 40 and 60° C. The initiator is then injected into the reactor in order to initiate the polymerization. The monomer consumption results in a decrease in pressure which is compensated for by a continuous water feed. The pressure is thus maintained in a range of preferably from 80 to 110 bar. The reactor is then cooled and degassed. The product is discharged and recovered in the form of a suspension. This suspension is filtered and the wet powder is washed and then dried.

The molar mass of the copolymer obtained by suspension polymerization is preferably from 100 000 to 500 000 g/mol, more preferentially from 150 000 to 400 000 g/mol.

According to yet another embodiment, the copolymer used according to the invention is prepared according to a radical emulsion polymerization process.

To do this, an aqueous dispersion of the initiator stabilized by the surfactant used to carry out the polymerization is advantageously prepared. To carry out this dispersion, the water, the initiator and a small fraction of all of the surfactant are mixed in a disperser. It is this dispersion which is added at the beginning and then optionally during the polymerization. After charging the polymerization reactor with water, surfactant, optionally paraffin and optionally the monomer E, the reactor is pressurized, after having removed the oxygen, while adding thereto the monomer A alone or as a mixture with the comonomers such as the monomer X and the monomer E, and the resulting mixture is brought to the chosen temperature. Advantageously, the aqueous emulsion is polymerized at a temperature of 50 to 130° C. Preferably, the polymerization is carried out at an absolute pressure of 40 to 120 bar. The initiation of the reaction is obtained by adding the initiator dispersion. During the polymerization, the monomer A, alone or as a mixture with the comonomers such as the monomer X and the monomer E, is optionally added in order to maintain the pressure or to obtained a controlled pressure variation. The initiator is optionally added in increments or continuously. A chain transfer agent (CTA) can optionally be added at the beginning of or during the polymerization. In the latter case, it can be introduced in increments or continuously. After introduction of the planned amount of monomer A or of the comonomer mixture, the reactor is degassed and cooled and the latex is emptied out.

The recovery of the copolymer from the latex constitutes the finishing operation. This consists essentially in coagulating the latex then in drying the coagulate to so as to obtain a dry powder. The finishing can also include a washing step. This washing can, for example, be carried out by introducing the latex, optionally diluted, into a coagulator in which it is subjected to a shear in the presence of air. Under the cumulative effect of these two actions, the latex is converted into an aerated cream with a density below that of water. This cream is optionally subjected to countercurrent washing with deionized water, for example according to the process described in the U.S. Pat. No. 4,128,517 and EP 0 460 284. The drying can be carried out according to any industrial means known to those skilled in the art. In particular, the coagulated latex or the cream can advantageously be dried in a spray-dryer. Thus, on exiting the washing column, or immediately after the coagulation, the aerated cream is sent to a storage container before being directed, by pumping, into a spray-dryer which converts it into a dry powder. This drying step in a spray-dryer can also be applied to the initial, optionally diluted, latex coagulated for example by mechanical shear with or without prior dilution or else to the aerated cream.

Another emulsion polymerization process that can be used for producing the copolymer is the process described in document U.S. Pat. No. 7,122,608.

The poly[$A_a$-co-(CTFE-VE-CTFE)$_b$] copolymer prepared according to the invention has chains with a random distribution of the triad CTFE-VE-CTFE which can be controlled by the copolymerization process. The CTFE randomly copolymerizes with the VDF and the TrFE, whereas the VE copolymerizes only with the CTFE, this being in an alternating manner. The main properties of PVDF, of PTrFE and of the poly(VDF-co-TrFE), such as chemical and heat resistance, are retained.

The copolymers obtained according to the invention are of use in particular for the production of membranes, paints, coatings and varnishes, such as anti-corrosion coatings, electroactive devices, energy devices, such as photovoltaic panels, fuel cells or Li-Ion batteries.

EXAMPLES

The following examples illustrate the invention without limiting it.

Measuring Techniques and Equipment

Nuclear Magnetic Resonance (NMR).

The NMR spectra are obtained on a Bruker AC 400 apparatus, deuterated acetone or deuterated DMF being used as solvents. The coupling constants and the chemical shifts are given, respectively, in Hertz (Hz) and in parts per million (ppm). The acquisition parameters for the $^1$H [or $^{19}$F] NMR are the following: rotation angle 90° [30°], acquisition time 4.5 s [0.7 s], pulse sequence 2 s scan number 8 [128] and a pulse time of 5 μs for the $^{19}$F NMR.

Size Exclusion Chromatography (SEC).

The SEC analyses were carried out on a Polymer Laboratories PL-GPC 50 Plus apparatus equipped with two 5 μm PL gel-mixed-C columns (molar mass range from 200 to 2×10$^6$ g/mol) thermostated at 35° C. A refractive index variation detector is used. Tetrahydrofuran (THF) is used as eluent (1.0 ml/min). The apparatus is calibrated with polystyrene (PS) standards and toluene as reference for the flow rate Thermogravimetric Analyses (TGA).

The TGA analyses are carried out on samples of 10-15 mg on a TGA Q 50 apparatus from TA Instruments in aluminum dishes. The temperature increase is carried out at 10° C./min between 25 and 590° C., under air.

Differential Scanning Calorimetry (DSC).

The DSC measurements are obtained on samples of 10-15 mg on a Netzsch DSC 200 F3 apparatus using the following analysis cycle: cooling from ambient temperature to −50° C. at 20° C./min, isotherm at −50° C. for 5 min, first increase from −50 to 200° C. at 10° C./min, cooling from 200 to −50° C. at 10° C./min, isotherm at 50° C. for 3 min, second temperature increase from −50 to 200° C. at 10° C./min and final cooling from 200° C. to ambient temperature. The calibration was carried out with noble metals and verified with an indium sample, before the analysis.

Infrared Spectroscopy (FTIR)

The FTIR spectra were recorded on a Perkin-Elmer Spectrum 1000 spectrometer, equipped with an ATR module, at 25°, with a precision of ±2 cm$^{-1}$.

Example 1: Radical Copolymerization of VDF with CTFE and CEVE

A 100 ml autoclave made of Hastelloy is equipped with inlet and outlet valves, a rupture disk, a manometer and a pressure sensor connected to a computer for recording the change in the pressure as a function of time. The autoclave is pressurized with 30 bar of nitrogen in order to verify that there are no leaks. It then undergoes three vacuum/nitrogen cycles in order to eliminate any trace of oxygen. After inerting of the reactor, 60 ml of a degassed solution containing di(tert-butylcyclohexyl) peroxydicarbonate (1.02 g, 2.56 mmol) and 2-chloroethyl vinyl ether (CEVE, 1.90 g, 12.8 mmol) in dimethyl carbonate (DMC) are introduced into the reactor. The reactor is then cooled to −80° C. in order to introduce the gaseous monomers. The chlorotrifluoroethylene (CTFE, 4.5 g, 39 mmol) then the vinylidene fluoride (VDF, 20.0 g, 313 mmol) are transferred into the reactor by double weighing. After having charged all the reagents, the autoclave is reheated to ambient temperature then heated to 48° C. The reaction lasts 15 hours and a pressure drop of 16 bar is observed relative to the 23 bar at the beginning of the reaction. After the reaction, the reactor is placed in an ice bath and degassed. This viscous and colorless reaction crude is transferred into a beaker and diluted in 200 ml of acetone. This solution is precipitated from 4 l of cold pentane. The product obtained, a white solid, is dried at 60° C. under vacuum for 14 h. The polymer obtained (yield=82%) is characterized by $^1$H (FIG. 3) and $^{19}$F (FIG. 2) NMR spectroscopy, SEC ($M_n$=42 kg/mol), TGA (FIG. 6) and DSC (FIG. 7). The initial VDF/CTFE/CEVE molar composition with respect to monomers is 86/10/4 and the final VDF/CTFE/CEVE molar composition of the copolymer is 79/14/7.

Example 2: Finkelstein Reaction, Preparation of a poly[VDF-co-(CTFE-IEVE-CTFE)] Copolymer 20.0 g of the poly[VDF-co-(CTFE-CEVE-CTFE)] copolymer are dissolved in dry acetone and introduced into a 100 ml autoclave. After the addition of 9.0 g (60 mmol) of sodium iodide, the reactor is closed and stirred at 60° C. for 7 days. At the end of the reaction, the autoclave is cooled to ambient temperature. After filtration through a sintered glass funnel, the solution is precipitated from cold water and then the polymer is dissolved in acetone and precipitated a second time from cold methanol. The yellow-colored solid obtained is filtered and then dried under vacuum (10 mbar) at 60° C. for 14 h (yield 75%).

Example 3: Michaelis-Arbuzov Reaction, Preparation of a poly[VDF-co-(CTFE-DEVP-CTFE)] Copolymer 10.0 g of the poly[VDF-co-(CTFE-IEVE-CTFE)] copolymer are dissolved in 50 ml of triethyl phosphite, in a 100 ml round-bottomed flask surmounted by a vertical water-cooled condenser. The reaction is heated at 140° C. for 8 hours. The crude solution is precipitated twice from diethyl ether, then the solid is filtered then dried at 120° C. at 0.05 mbar for 24 hours. Lastly, a final precipitation from diethyl ether makes it possible to obtain a brown powder (yield 63%) which is dried at 80° C. under vacuum for 14 hours.

Example 4: Hydrolysis, Preparation of a poly[VDF-co-(CTFE-VPA-CTFE)] Copolymer A 250 ml three-necked round-bottomed flask, equipped with a 50 ml dropping funnel, with a vertical condenser and with a thermometer, is dried and flushed with nitrogen for 15 minutes. This round-bottomed flask contains 8.0 g of the copolymer synthesized in example 3. A slight nitrogen overpressure is applied in the assembly in order to prevent any introduction of moisture into the system. 60 ml of anhydrous tetrahydrofuran are added via the dropping funnel. The reaction medium is placed in an ice bath and cooled to 4° C. 675 mg of bromotrimethyl silane (TMSBr, 4.41 mmol) are introduced dropwise for 15 minutes. After 30 minutes, the reaction medium is gradually brought back to ambient temperature. The reaction is carried out for 15 hours, then 100 ml of methanol are introduced via the dropping funnel. The solution is vigorously stirred for 2 hours. Once the reaction has ended, the solvents are evaporated off using a rotary evaporator under vacuum at 50° C. The solid obtained is dissolved in acetone and then precipitated twice from 2 liters of cold methanol. The white powder obtained (yield 42%) is dried at 60° C. under vacuum for 14 hours and then characterized by $^1$H, $^{19}$F and $^{31}$P NMR spectroscopy, TGA and DSC.

Figure 3:
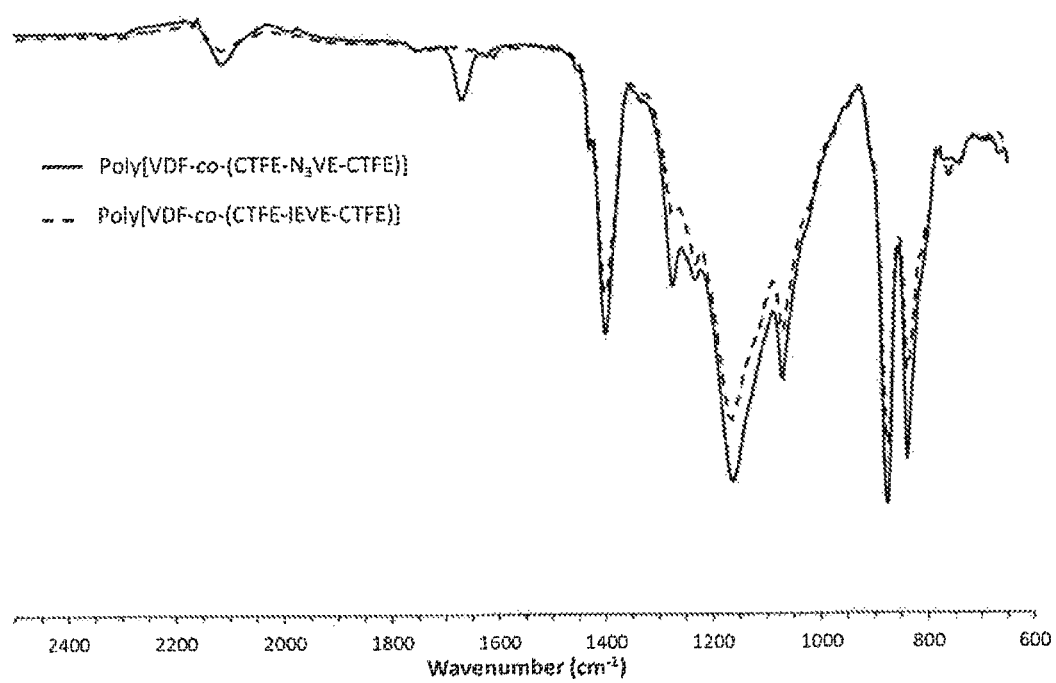
FIG. 3 represents FTIR spectra of the poly[VDF-co-(CTFE-IEVE-CTFE)] (dashed line, example 2) and poly[VDF-co-(CTFE-N$_3$VE-CTFE)] (solid line, example 5) copolymers.

Example 5: Azidation Reaction, Preparation of a poly[VDF-co-(CTFE-N$_3$EVE-CTFE)] Copolymer 5.00 g of the poly[VDF-co-(CTFE-IEVE-CTFE)] copolymer are dissolved in 30 ml of DMF. The resulting solution and 1.00 g of sodium azide (15.4 mmol) are then placed in a 50 ml round-bottomed flask and stirred. The reaction is heated at 50° C. for 24 hours. The product is then filtered through filter paper. The product is purified by precipitation from cold methanol and drying at 40° C. under vacuum for 14 hours (FIG. 3, yield of 87%). A fine, pale yellow powder is obtained.

FIG. 1 represents a $^{19}$F NMR spectrum of the poly[VDF-co-(CTFE-CEVE-CTFE)] copolymer in DMSO d$_6$ at 20° C. synthesized by virtue of the process described in example 1.

The $^{19}$F NMR spectrum makes it possible to observe the various types of fluorine atoms present in the copolymer. The spectrum is very similar to that of a PVDF homopolymer with the normal additions (head-tail) at −92 ppm and the reverse additions (head-head) at −114 and −116 ppm. The unresolved peaks at −108 and −120 ppm are attributed to the fluorine atoms of the CTFE.

The $^{19}$F NMR spectrum makes it possible to determine the VDF/CTFE molar ratio required for calculating the molar composition of the copolymer.

No signals characteristic of CTFE-CTFE sequences are observed at −127 ppm, nor are any signals characteristic of a long alternating CTFE-VE-CTFE sequence. The absence of these signals confirms the introduction along the polymer chain of a single CTFE-VE-CTFE triad.

Figure 2:
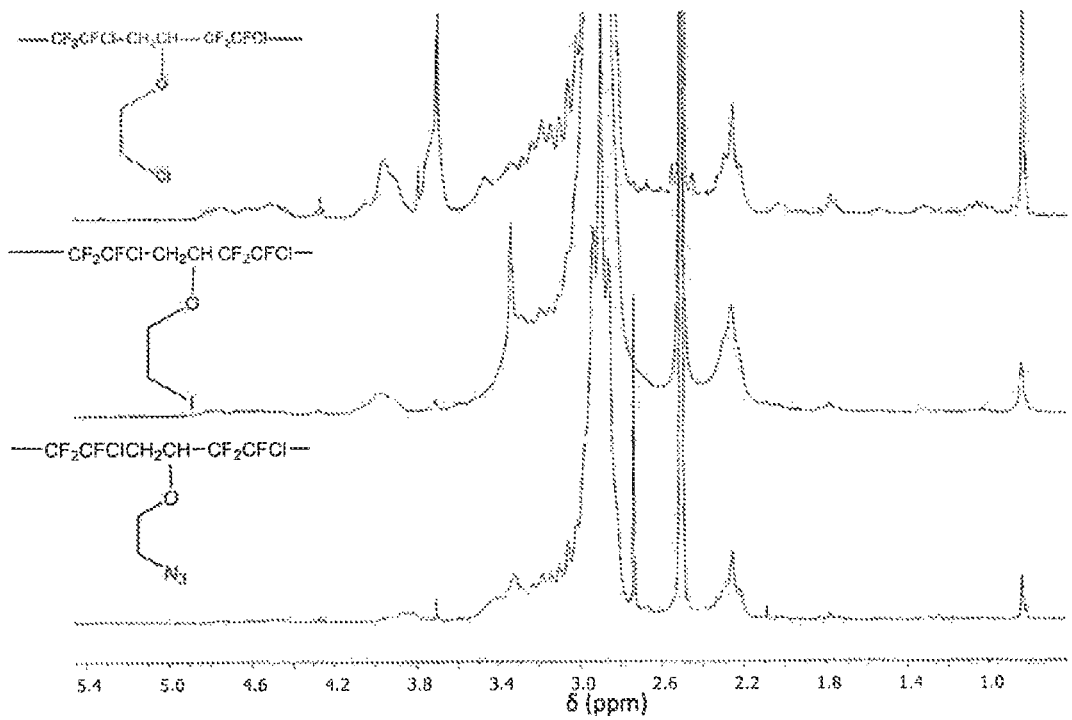
FIG. 2 represents $^1$H NMR spectra of the poly[VDF-co-(CTFE-CEVE-CTFE)] (top, example 1), poly[VDF-co-(CTFE-IEVE-CTFE)] (middle, example 2) and poly[VDF-co-(CTFE-N$_3$VE-CTFE)] (bottom, example 5) copolymers in DMSO $d_6$ at 20° C.

FIG. 2 represents the $^1$H NMR spectra of the poly[VDF-(CTFE-CEVE-CTFE)] (top, example 1), poly[VDF-co-(CTFE-IEVE-CTFE)] (middle, example 2) and poly[VDF-co-(CTFE-N$_3$VE-CTFE)] (bottom, example 5) copolymers in DMSO d$_6$ at 20° C. The $^1$H NMR spectra make it possible to observe the various types of protons present in the copolymers. The unresolved peak between 2.6 and 3.2 ppm corresponds to the C$\underline{H}_2$ protons of the VDF units in the head-tail sequences. The unresolved peak between 2.3 and 2.6 ppm corresponds to the C$\underline{H}_2$ protons of the VDF units in the tail-tail sequences.

The unresolved peak between 3.2 and 3.6 ppm corresponds to the C$\underline{H}_2$—CH(OR)-protons of the VE units along the backbone of the copolymer. The unresolved peak between 4.3 and 4.9 ppm corresponds to the CH$_2$—C$\underline{H}$(OR)-protons of the VE units along the backbone of the copolymer. The unresolved peak between 3.8 and 4.1 ppm corresponds to the OC$\underline{H}_2$CH$_2$—X protons adjacent to the oxygen of the vinyl ether side chain.

The unresolved peak corresponding to the OCH$_2$C$\underline{H}_2$—X protons shifts between 3.1 and 3.8 ppm according to the copolymer. It is characteristic of the various functionalization steps. Between each step, a total disappearance of the preceding signal is observed, confirming the efficiency of the chemical modification.

The $^1$H NMR spectrum makes it possible to determine the VDF/VE molar ratio required for calculating the molar composition of the copolymer.

The $^1$H NMR spectra make it possible to prove the validity of the functionalization/chemical modification steps.

FIG. 3 represents FTIR spectra of the poly[VDF-co-(CTFE-IEVE-CTFE)] (dashed line, example 2) and poly[VDF-co-(CTFE-N$_3$VE-CTFE)] (solid line, example 5) copolymers.

This figure confirms the chemical modification of the copolymers and in particular the azidation step barely visible by NMR. The presence of an azide function (N$_3$) is confirmed by the valence vibration band observed around 2200 cm$^{-1}$.

Figure 4:
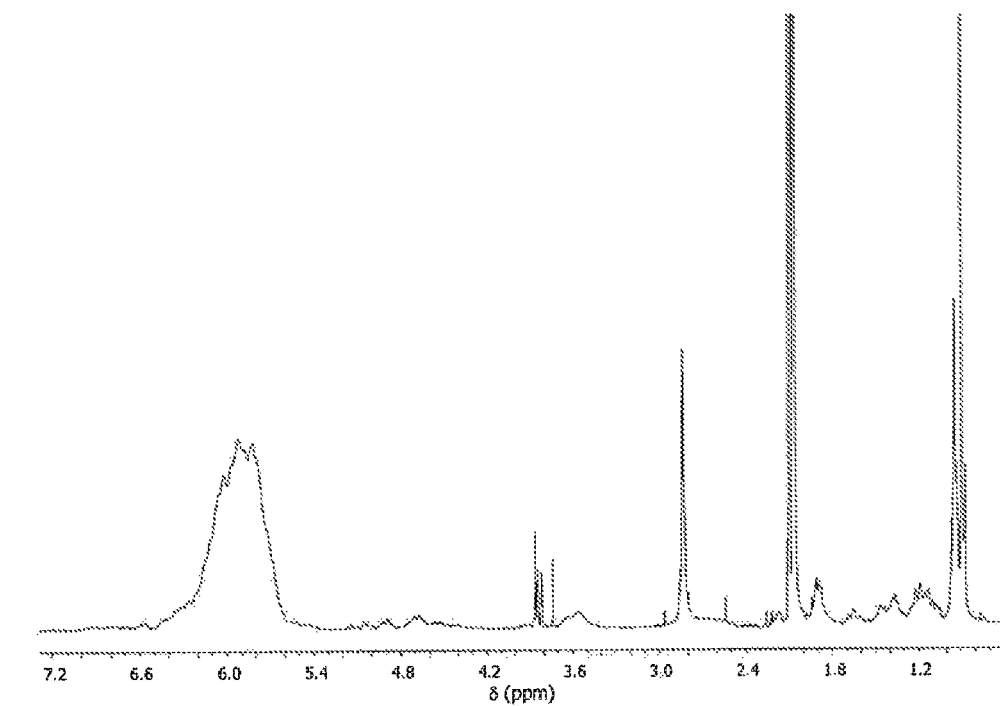
FIG. 4 represents a $^1$H NMR spectrum of the poly[TrFE-co-(CTFE-iBuVE-CTFE)] copolymer in acetone $d_6$ at 20° C. synthesized by virtue of the process described in example 1.

FIG. 4 represents the $^1$H NMR spectrum of the poly[TrFE-co-(CTFE-iBuVE-CTFE)] copolymer in acetone d$_6$ at 20° C. synthesized by virtue of the process described in example 1.

The $^1$H NMR spectrum makes it possible to observe the various types of protons present in the copolymer. The unresolved peak between 5.5 and 6.5 ppm corresponds to the protons of the CF$\underline{H}$ units of the trifluoroethylene moieties. The unresolved peak at 1.1 ppm corresponds to the 6 C$\underline{H}_3$ protons of the isobutyl moiety of the vinyl ether. The $^1$H NMR spectrum proves the incorporation of the vinyl ether into the polymer, whereas the TrFE and the iBuVE do not copolymerize.

Figure 5:
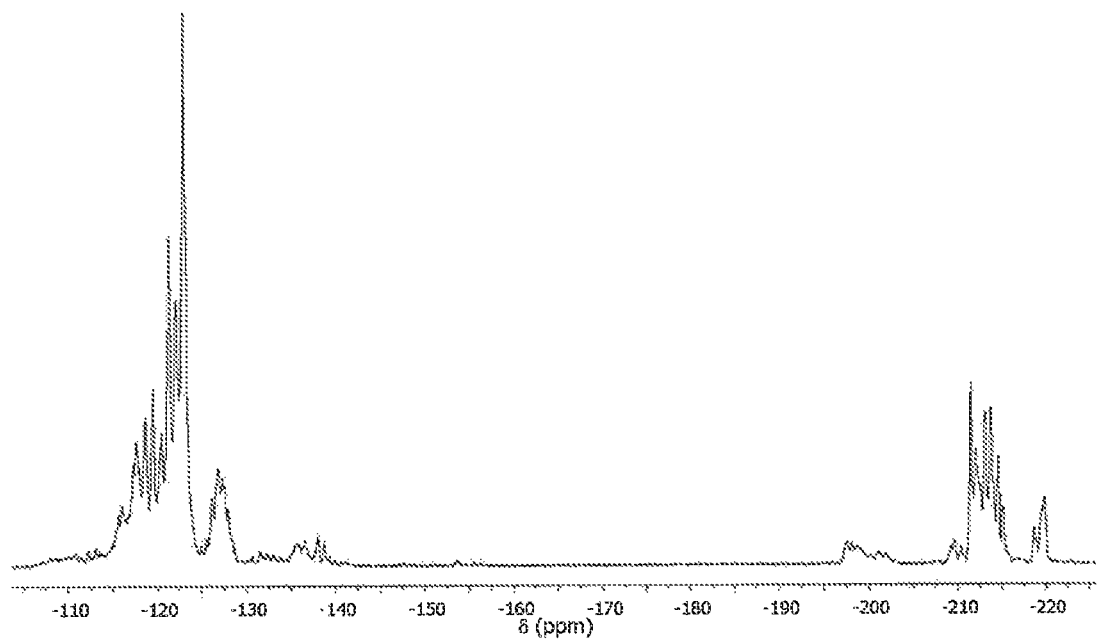
FIG. 5 represents a $^{19}$F NMR spectrum of the poly[TrFE-co-(CTFE-iBuVE-CTFE)] copolymer in acetone $d_6$ at 20° C. synthesized by virtue of the process described in example 1.

FIG. 5 represents a $^{19}$F NMR spectrum of the poly[TrFE-co-(CTFE-iBuVE-CTFE)] copolymer in acetone d$_6$ at 20° C. synthesized by virtue of the process described in example 1.

The $^{19}$F NMR spectrum makes it possible to observe the various types of fluorine atoms present in the copolymer. The signals observed at −195 and −225 ppm correspond to the fluorine atoms of the C$\underline{F}$H units of the trifluoroethylene. The complex unresolved peaks between −105 and −145 ppm correspond to those of the trifluoroethylene, CF$_2$, and of the CTFE, CF$_2$ and CFCl.

The $^{19}$F NMR spectrum proves the introduction of CTFE along the polymer chain.

Figure 6:
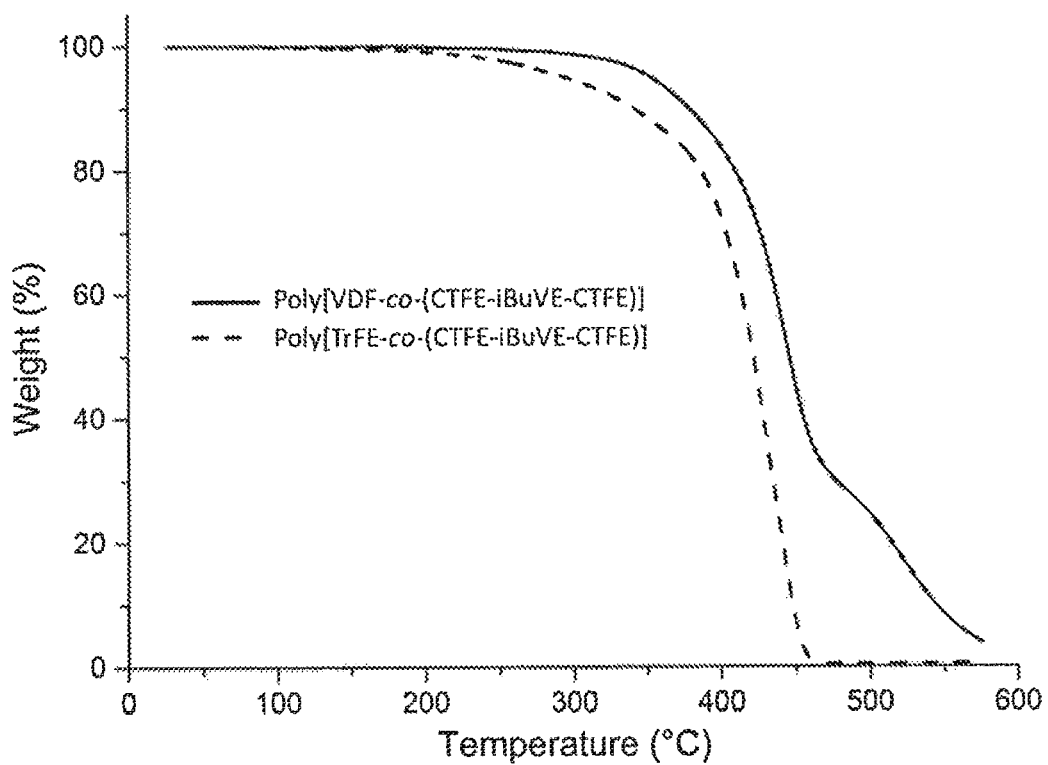
FIG. 6 represents TGA thermograms at 10° C./min under air, of a poly[VDF-co-(CTFE-iBuVE-CTFE)] copolymer (solid line) and of a poly[TrFE-co-(CTFE-CEVE-CTFE)] copolymer (dashed line) synthesized by virtue of the process described in example 1.
Figure 7:
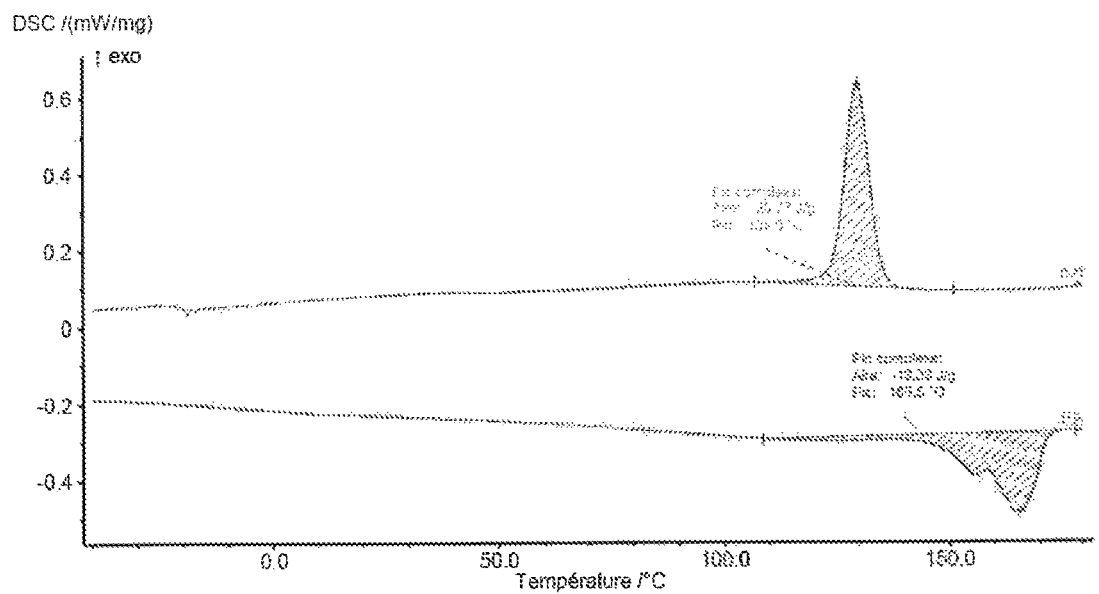
FIG. 7 represents a DSC thermogram of the poly[VDF-co-(CTFE-CEVE-CTFE)] copolymer (example 1).

FIG. 6 represents the TGA thermograms at 10° C./min under air, of a poly[VDF-co-(CTFE-iBuVE-CTFE)] copolymer (solid line) and of a poly[TrFE-co-(CTFE-CEVE-CTFE)] copolymer (dashed line) synthesized by virtue of the process described in example 1.

The introduction of the CTFE-VE-CTFE triad does not decrease the very good heat stability of the fluoropolymers. The polymer with a PVDF backbone remains stable under air up to 300° C.

FIG. 7 represents a DSC thermogram of the poly[VDF-co-(CTFE-CEVE-CTFE)] copolymer (example 1).

The introduction of the CTFE-VE-CTFE triad decreases by 5-10° C. the melting point of PVDF and also its degree of crystallinity. However, the copolymer remains strongly crystalline and the melting point remains sufficiently high to guarantee the properties of the final copolymer.

Example 6: Preparation of a poly[VDF-co-(CTFE-OHVE-CTFE)] Copolymer

A 100 ml autoclave made of Hastelloy is equipped with inlet and outlet valves, a rupture disk, a manometer and a pressure sensor connected to a computer for recording the change in the pressure as a function of time. The autoclave is pressurized with 30 bar of nitrogen in order to verify that there are no leaks. It then undergoes three vacuum/nitrogen cycles in order to eliminate any trace of oxygen. After inerting of the reactor, 60 ml of a degassed solution containing di(tert-butylcyclohexyl) peroxydicarbonate (1.02 g, 2.56 mmol) and 2-hydroxyethyl vinyl ether (OHVE, 2.29 g, 26.0 mmol) in dimethyl carbonate (DMC) are introduced into the reactor. The reactor is then cooled to −80° C. in order to introduce the gaseous monomers. The chlorotrifluoroethylene (CTFE, 8.0 g, 69 mmol) then the vinylidene fluoride (VDF, 30.5 g, 477 mmol) are transferred into the reactor by double weighing. After having charged all the reagents, the autoclave is reheated to ambient temperature then heated to 48° C. The reaction lasts 15 hours and a pressure drop of 16 bar is observed relative to the 23 bar at the beginning of the reaction at 48° C. After the reaction, the reactor is placed in an ice bath and degassed. The viscous and colorless reaction crude is transferred into a beaker and diluted in 200 ml of acetone. This solution is precipitated from 4 l of cold pentane. The product obtained, a white solid, is dried at 60° C. under vacuum for 14 h.

Figure 8:
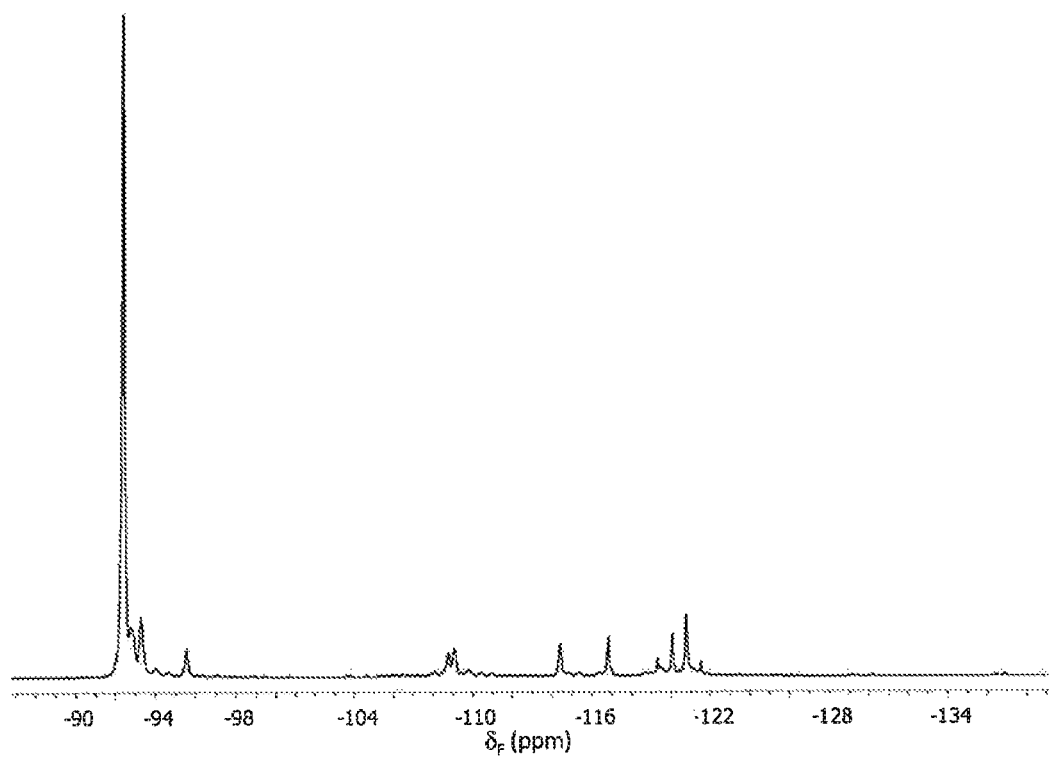
FIG. 8 represents a $^{19}$F NMR spectrum of the poly[VDF-co-(CTFE-OHVE-CTFE)] copolymer in DMF $d_7$ at 25° C. synthesized by virtue of the process described in example 6.
Figure 9:
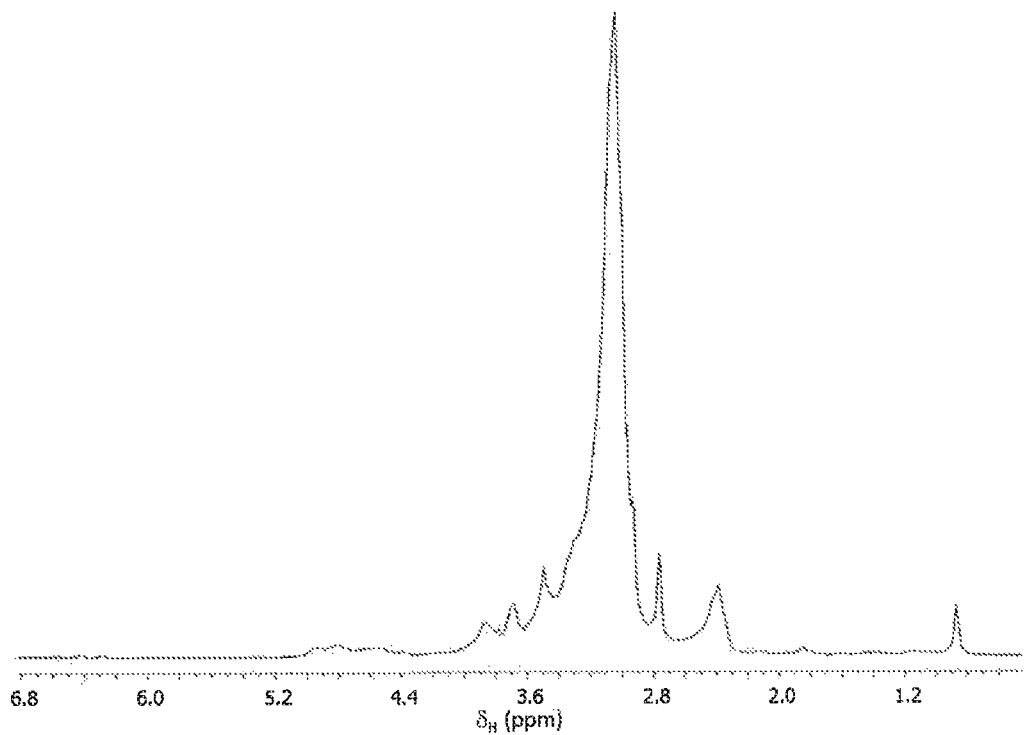
FIG. 9 represents the $^1$H NMR spectrum of the same poly[VDF-co-(CTFE-OHVE-CTFE)] copolymer in DMF $d_7$ at 25° C.

The copolymer (yield 81%) is characterized by $^1$H (FIG. 9) and $^{19}$F (FIG. 8) NMR spectroscopy. The broad signal centered around 5 PPM and those at 3.6 and 3.9 ppm on the $^1$H NMR spectrum confirm the presence of OHVE (hydroxyethyl vinyl ether) in the copolymer. The $^{19}$F NMR spectrum does not show signals characteristic of CTFE-CTFE sequences (−130 ppm) or signals characteristic of a long alternating CTFE-VE CTFE sequence (broad and complex unresolved peaks between −110 ppm and −126 ppm). The absence of these signals confirms the introduction along the chain of a single CTFE-VE-CTFE triad. The VDF/CTFE/OHVE molar composition of the copolymer, obtained by combining the $^1$H and $^{19}$F NMR spectra, is 80/14/6.

Figure 10:
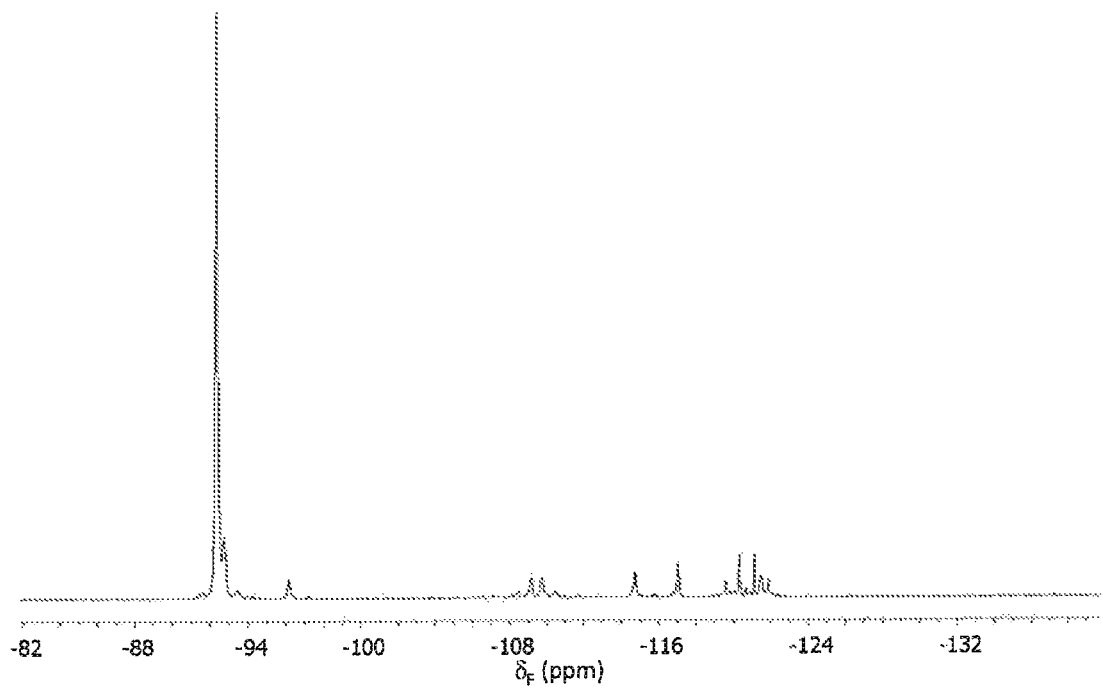
FIG. 10 represents a $^{19}$F NMR spectrum of the poly[VDF-co-(CTFE-OHVE-CTFE)] copolymer functionalized by allyl isocyanate, in acetone $d_6$ at 25° C., synthesized by virtue of the process described in example 7.
Figure 11:
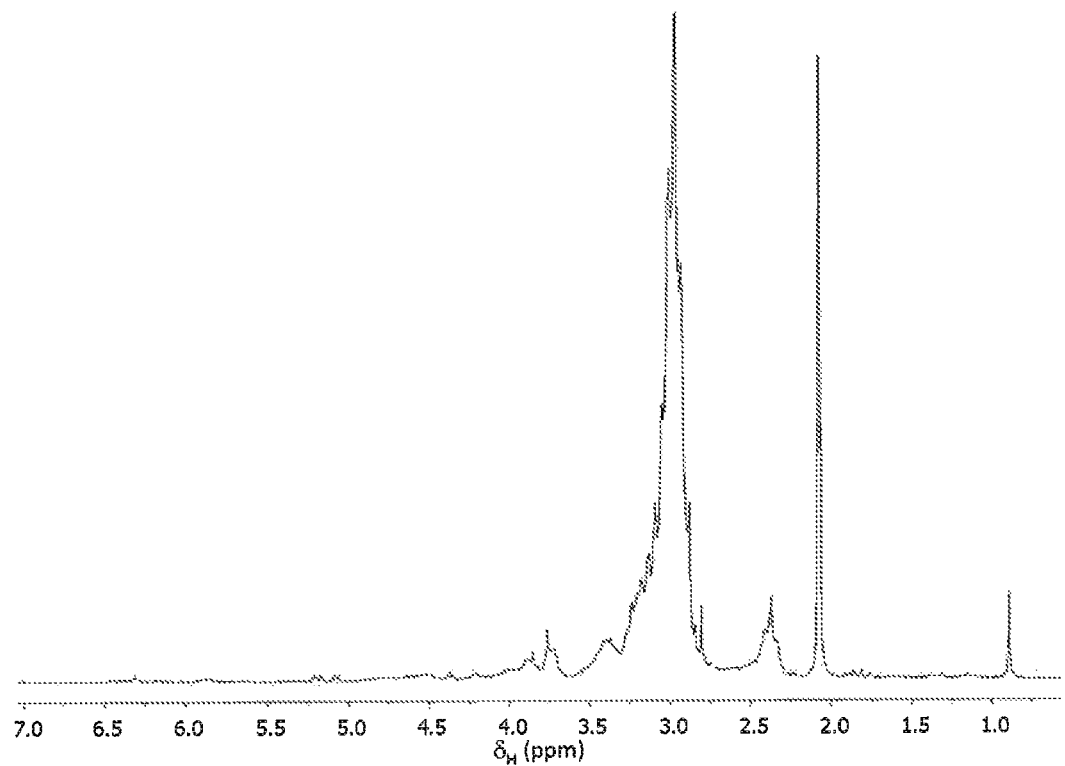
FIG. 11 represents the $^1$H NMR spectrum of the same functionalized poly[VDF-co-(CTFE-OHVE-CTFE)] copolymer in acetone $d_6$ at 25° C.
Figure 12:
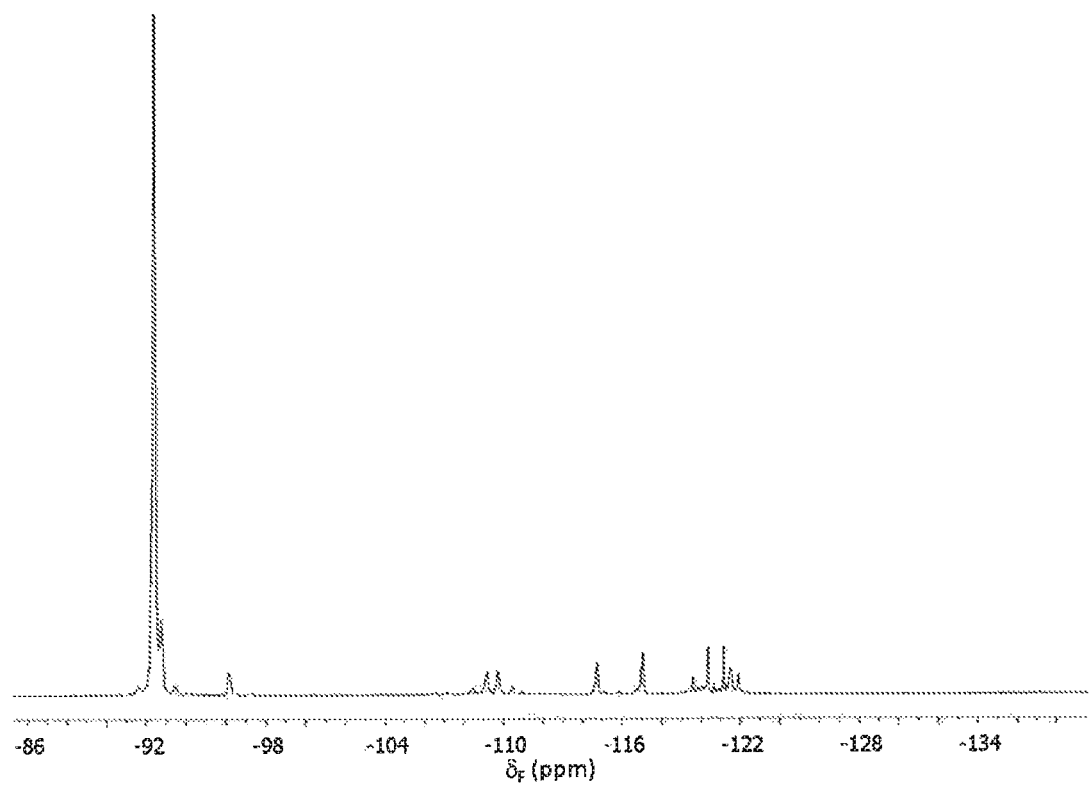
FIG. 12 represents a $^{19}$F NMR spectrum of the poly[VDF-co-(CTFE-OHVE-CTFE)] copolymer functionalized by 2-(methacryloyloxy)ethyl isocyanate, in acetone $d_6$ at 25° C., synthesized by virtue of the process described in example 7.
Figure 13:
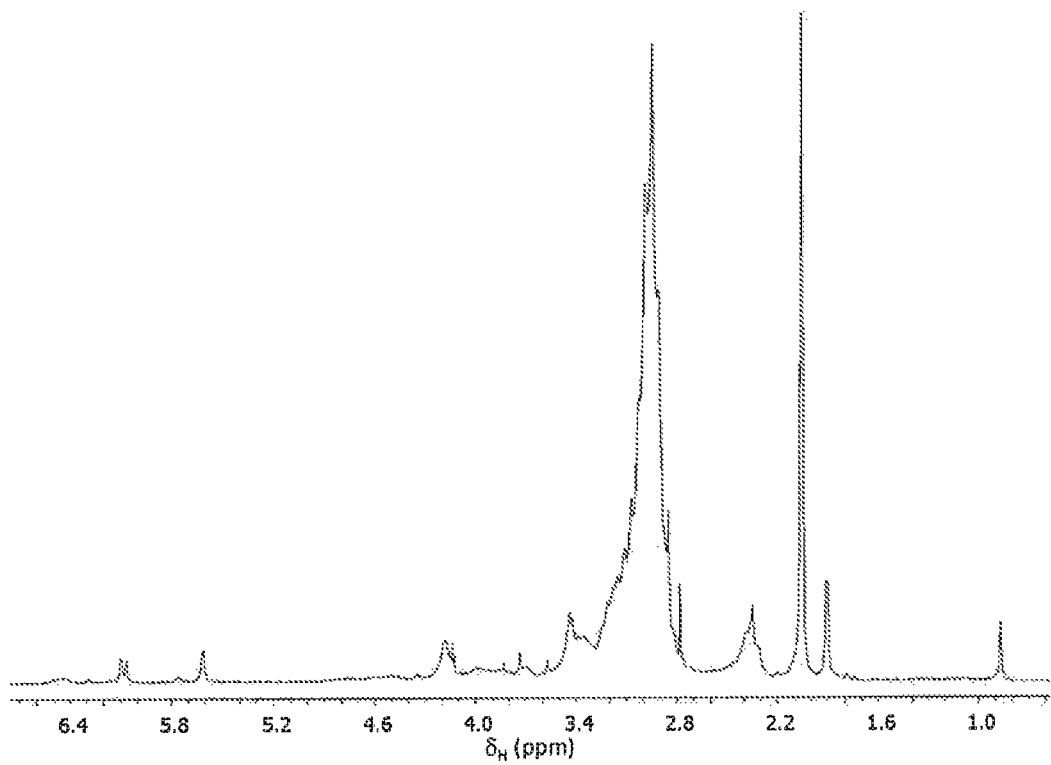
FIG. 13 represents the $^1$H NMR spectrum of the same functionalized poly[VDF-co-(CTFE-OHVE-CTFE)] copolymer in acetone $d_6$ at 25° C.

Example 7: Preparation of Functionalized poly[VDF-co-(CTFE-OHVE-CTFE)] Copolymers A stock solution containing 10.0 g of terpolymer obtained according to example 6 in 50.0 g of 2-butanone (MEK) is prepared at 50° C. 5.0 g of the stock solution are transferred into a sample tube, to which 0.909 mmol of allyl isocyanate (AlI) or of 2-(methacryloyloxy)ethyl isocyanate (MAI) is added. After 24 h with vigorous stirring, the solution is precipitated from 1 l of vigorously stirred cold water. The copolymer, a white solid, is recovered by filtration and then dried at 50° C. under vacuum for 24 h. The final product is characterized by $^{19}$F (FIGS. 10 and 12) and $^1$H (FIGS. 11 and 13) NMR. As emerges from the $^{19}$F NMR spectra, which are identical to that of FIG. 8, the grafting of the functional isocyanate moieties does not modify the structure of the polymer chain. In $^1$H NMR, signals at 5.6 and 6.1 ppm are observed for the AlI-functionalized copolymer (FIG. 11), said signals being characteristic of the protons of the double bond of the allyl function. The signals assigned to the —O—C$\underline{H}_2$—C$\underline{H}_2$—O of the pendent chain of the VE, initially at 3.6 and 3.9 ppm, are shifted to 3.4 and 4.2 ppm, which confirms the formation of a urethane bond.

This $^1$H NMR spectrum thus demonstrates that the AlI is indeed grafted onto the pendent hydroxyl groups of the functionalized copolymer. Likewise, the $^1$H NMR spectrum obtained for the MAI-functionalized copolymer (FIG. 13) confirms the grafting of the MAI groups (the signals of the double bond are present around 5.2 ppm).

The copolymers obtained bear pendent double bonds which allow them to subsequently be easily crosslinked via the radical process, in the presence of a crosslinking co-agent and of a radical initiator that may be a thermal initiator or a photoinitiator. The crosslinking parameters (temperature, light intensity, wavelength) will be chosen by those skilled in the art according to the initiator used.

Example 8: Preparation of Crosslinked poly[VDF-co-(CTFE-OHVE-CTFE)] Copolymers

Figure 14:
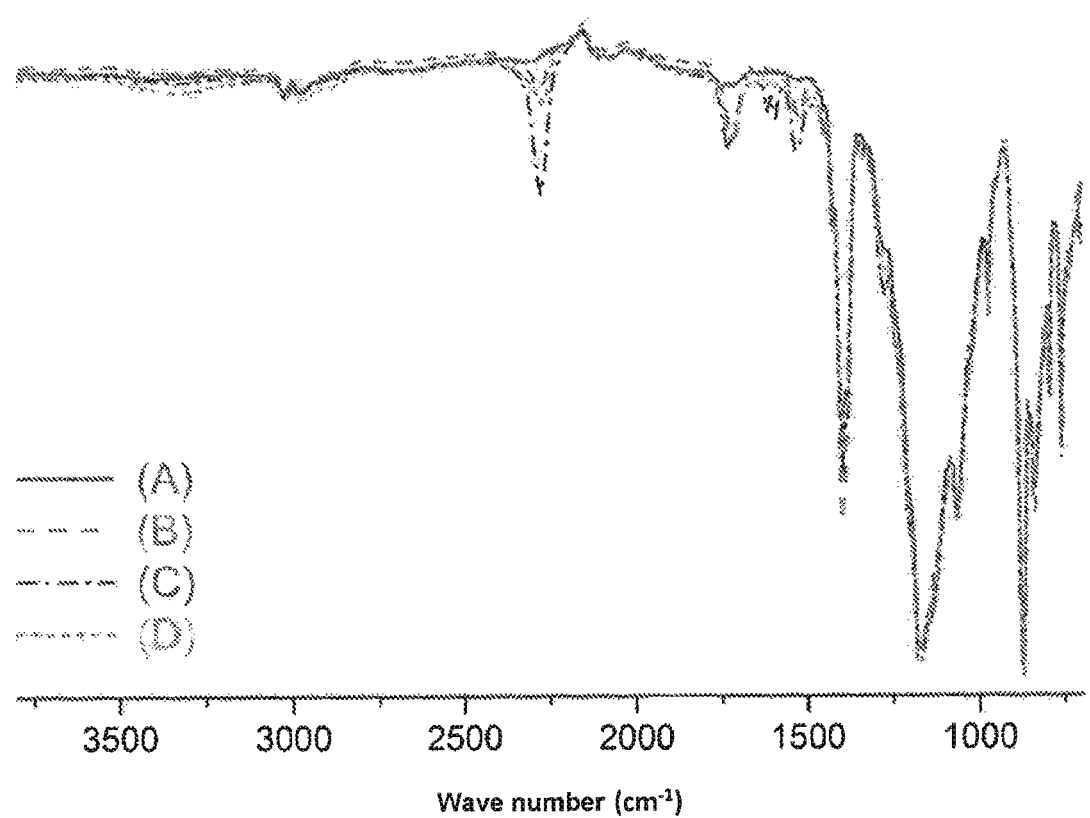
FIG. 14 represents FTIR spectra of poly[VDF-co-(CTFE-OHVE-CTFE)] copolymers crosslinked using various crosslinking agents, synthesized by virtue of the process described in example 8.

A stock solution containing 10.0 g of terpolymer in 50.0 g of 2-butanone (MEK) is prepared at 50° C. 5.0 g of solution are transferred into a sample tube, to which 0.909 mmol of hexamethyl diisocyanate (HMDI) is added. After homogenization, a film is prepared from this mixture on a glass plate. After 2 h at 25° C., the drying is continued in a ventilated oven at atmospheric pressure at 100° C. The procedure is repeated with toluene diisocyanate (TDI) and isophorone diisocyanate (IDI). A film without diisocyanate is also prepared as reference. All the films have a thickness of approximately 23 μm, are homogeneous, slightly opaque and show very good properties of adhesion to glass. They are characterized by FTIR, the spectrum of which (FIG. 14) shows, at 1750 cm$^{-1}$, the band characteristic of urethane bonds. These crosslinked polymers were tested in order to evaluate their solubility in DMF at 25° C. for 24 h, which was compared to that of a film of the functionalized copolymer: all the copolymers prepared according to the protocol mentioned above were insoluble.

Example 9: Preparation of poly[VDF-co-(CTFE-GcVE-CTFE)] Copolymers

In a manner similar to example 6, a 100 ml autoclave made of Hastelloy is equipped with inlet and outlet valves, a rupture disk, a manometer and a pressure sensor connected to a computer for recording the change in the pressure as a function of time. The autoclave is pressurized with 30 bar of nitrogen in order to verify that there are no leaks. It then undergoes three vacuum/nitrogen cycles in order to eliminate any trace of oxygen. After inerting of the reactor, 60 ml of a degassed solution containing di(tert-butylcyclohexyl) peroxydicarbonate (1.02 g, 2.56 mmol) and glycidyl vinyl ether (GcVE, 2.18 g, 21.8 mmol) in dimethyl carbonate (DMC) are introduced into the reactor. The reactor is then cooled to −80° C. in order to introduce the gaseous monomers. The chlorotrifluoroethylene (CTFE, 9.0 g, 78 mmol) then the vinylidene fluoride (VDF, 28.0 g, 438 mmol) are transferred into the reactor by double weighing. After having charged all the reagents, the autoclave is reheated to ambient temperature then heated to 48° C. The reaction lasts 15 hours and a pressure drop of 16 bar is observed relative to the 23 bar at the beginning of the reaction at 48° C. After the reaction, the reactor is placed in an ice bath and degassed. This viscous and colorless reaction crude is transferred into a beaker and diluted in 200 ml of acetone. This solution is precipitated from 4 l of cold pentane. The white solid obtained is dried at 60° C. under vacuum for 14 h.

Figure 15:
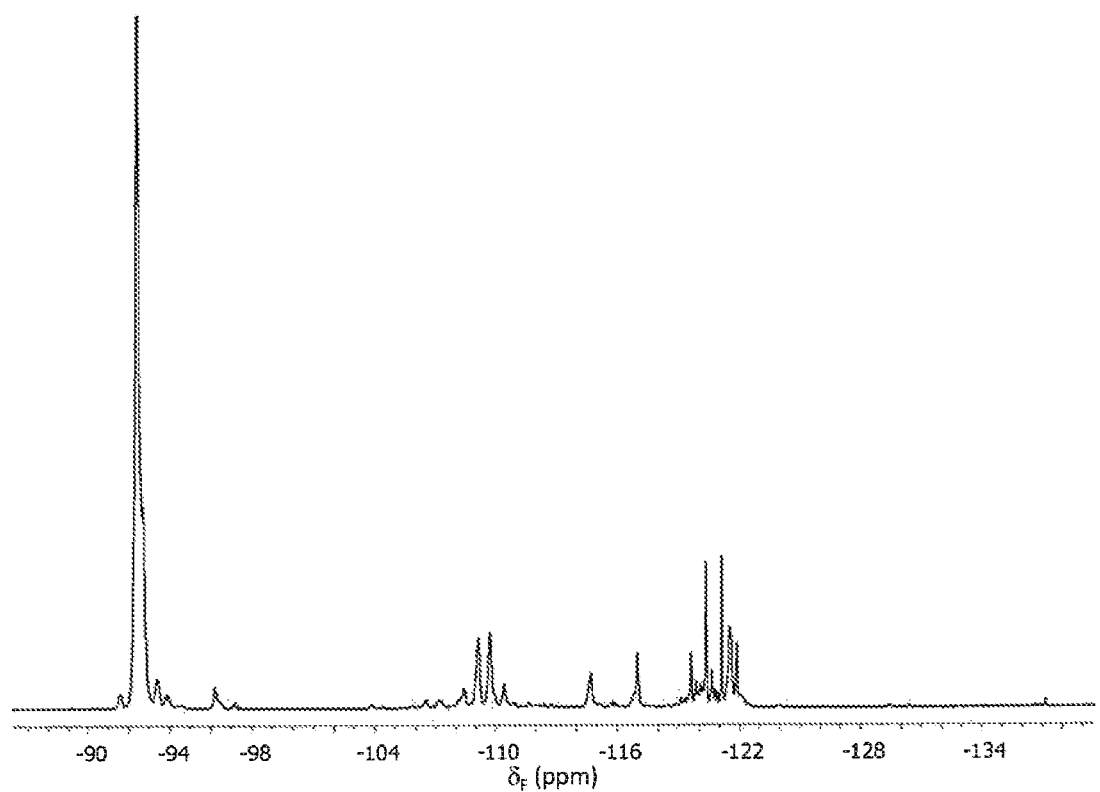
FIG. 15 represents a $^{19}$F NMR spectrum of the poly[VDF-co-(CTFE-GcVE-CTFE)] copolymer in acetone $d_6$ at 25° C., synthesized by virtue of the process described in example 9.
Figure 16:
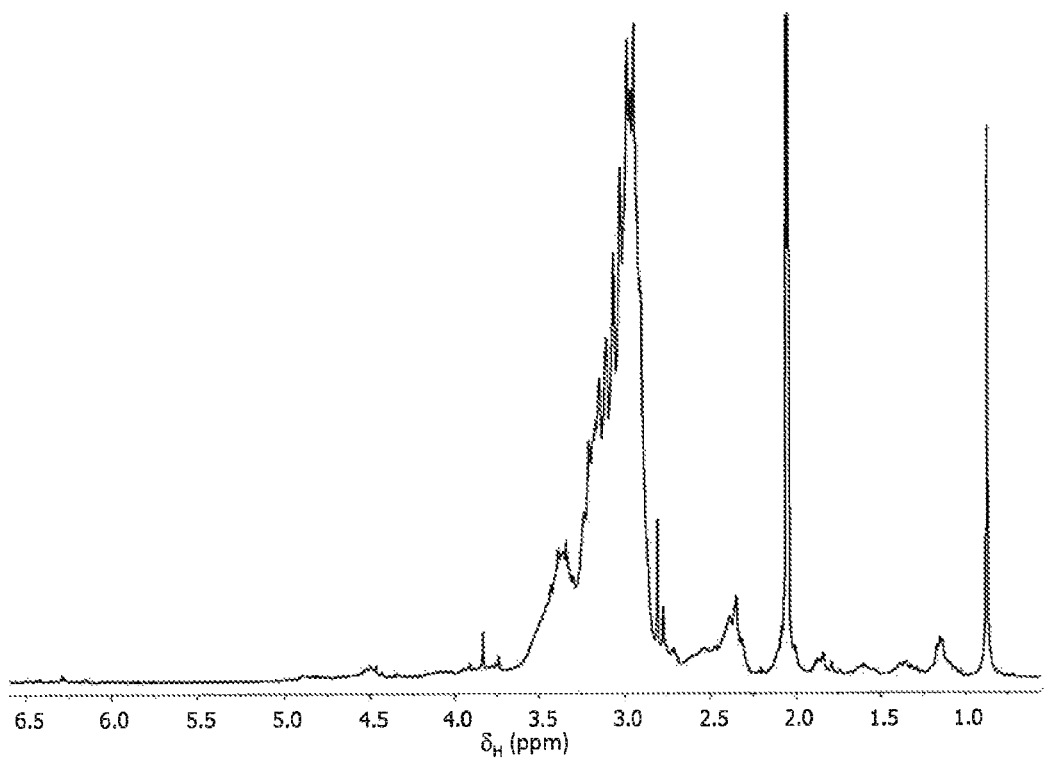
FIG. 16 represents the $^1$H NMR spectrum of the same poly[VDF-co-(CTFE-GcVE-CTFE)] copolymer in acetone $d_6$ at 25° C.

The copolymer obtained (yield=74%) is characterized by $^{19}$F (FIG. 15) and $^1$H (FIG. 16) NMR spectroscopy. On the $^{19}$F NMR spectrum, very weak signals characteristic of CTFE-CTFE sequences (−130 ppm) are observed, but no signals characteristic of a long alternating CTFE-VE CTFE sequence (broad and complex unresolved peaks between −110 ppm and −126 ppm). The absence of these signals confirms the introduction along the chain of a single CTFE-VE-CTFE triad. In $^1$H NMR, the broad peak at 3.4 ppm corresponds to the protons of the GcVE moiety and thus confirms its presence along the polymer chain. The VDF/CTFE/GcVE molar composition of the terpolymer, obtained by combining the $^1$H and $^{19}$F NMR spectra, is 73/23/4.

This copolymer can be crosslinked in a manner conventional for those skilled in the art, by reacting it with polyfunctional compounds such as diamines, dials or dicarboxylic acids.

The invention claimed is:

1. A fluorinated copolymer of formula (I) below:

poly[A-co-X-co-(X-E-X)]    (I)

in which A is a fluorinated monomer, X is chlorotrifluoroethylene (CTFE); X is capable of copolymerizing with, said monomer A and, also with a monomer E in an alternating manner, E is vinyl ether of formula $CH_2$=CH—O—R in which R is selected from the group consisting of: alkyls; glycerol, saccharide; halogenated groups; thiols, silanes, sulfonic acid, phosphonic acids, azides, alkynes, carbonates, amines, ammoniums, amidine, aldehyde, isocyanate, urea, sulfonates, phosphonates, silicones, and fluorinated or hydrocarbon-based polymers and oligomers;

wherein A is selected from the group consisting of vinylidene fluoride (VDF), trifluoroethylene (TrFE) or mixtures thereof and wherein the proportion of moieties derived from the monomer A is greater than 85 mole %.

2. The copolymer as claimed in claim 1, wherein the monomer E is an vinyl ether of formula $CH_2$=CH—O—R in which R is selected from the group consisting of: ethyl, butyl, iso-butyl, 2-ethylhexyl, tert-butyl, 2-chloroethyl, chloro-(2,2-dimethylpropyl) and triethoxysilane.

3. The copolymer as claimed in claim 1, wherein the monomer E is an vinyl ether of formula $CH_2$=CH—O—R in which R is chosen from the group consisting of: saccharide thiols, silanes, phosphonic acids, sulphonic acids, azides, alkynes, carbonates, amines, ammoniums, amidine, aldehyde, isocyanate, urea, sulfonates, phosphonates, silicones, and fluorinated or hydrocarbon-based polymers and oligomers.

4. The copolymer as claimed in claim 1, comprising:
a proportion of moieties derived from monomer E of less than 5%, and greater than or equal to 0.1%;
an X:E molar ratio of greater than or equal to 2.

5. A process for producing the copolymer of formula (I) as claimed in claim 1, comprising a step of radical copolymerization of a reaction mixture comprising the fluorinated monomer A, the monomer E and the monomer X; the X:E molar ratio being greater than or equal to 2; the molar ratio of the monomer A being greater than 0.85; wherein the monomer A is selected from the group consisting of VDF, TrFE or a mixture thereof, the monomer X is CTFE and the monomer E is an alkyl vinyl ether (VE) of formula $CH_2$=CH—O—R in which R is selected from the group consisting of: alkyls; glycerol, saccharide; halogenated groups; thiols, silanes, sulfonic acid, phosphonic acid, azides, alkynes, carbonates, amines, ammoniums, amidine, aldehyde, isocyanate, urea, sulfonates, phosphonates, silicones, and fluorinated or hydrocarbon-based polymers and oligomers.

6. The process as claimed in claim 5, for producing a copolymer of formula (I), wherein the monomer E is a vinyl ether (VE) of formula $CH_2$=CH—O—R in which R is selected from the group consisting of: ethyl, butyl, iso-butyl, 2-ethylhexyl, tert-butyl, 2-chloroethyl, chloro-(2,2-dimethylpropyl) and triethoxysilane.

7. The process of claim 5, wherein:
the molar proportion of VE, in the reaction mixture, is less than 5%, and greater than or equal to 0.1%;
the X:E, chlorotrifluoroethylene:vinyl ether, molar ratio is greater than or equal to 2;
the molar proportions being related to the sum of moles of VDF, of TrFE, of CTFE and of VE.

8. The process as claimed in claim 5, wherein said copolymer is obtained by radical solution polymerization comprising a step of copolymerization of said reaction mixture in the presence of a radical initiator and of a solvent.

9. The process as claimed in claim 8, wherein said solvent is selected from the group consisting of 1,1,1,3,3-pentafluorobutane, acetonitrile, methyl ethyl ketone, dimethyl carbonate, 2,2,2-trifluoroethanol, tert-butanol, hexafluoroisopropanol, methyl acetate, ethyl acetate, cyclohexanone and water, and mixtures thereof.

10. The process as claimed in claim 5 wherein said copolymer is obtained by radical suspension polymerization comprising a step of copolymerization of said reaction mixture in the presence of water, of an initiator, optionally of a dispersing agent, and optionally of a chain transfer agent.

11. The process as claimed in claim 5 wherein said copolymer is obtained by radical emulsion polymerization comprising a step of polymerization of said reaction mixture in the presence of water, of a surfactant and of an aqueous dispersion of initiator.

12. The process as claimed in claim 5 comprising an additional step of functionalization of said VE monomer.

13. Coatings comprising at least one copolymer as claimed in claim 1.

14. Membranes comprising at least one copolymer as claimed in claim 1.

15. Electroactive devices comprising at least one copolymer as claimed in claim 1.

16. The copolymer of claim 1, wherein the copolymer comprises a proportion of moieties derived from the monomer A of greater than 90%.

17. The copolymer of claim 1, wherein the copolymer comprises less than 10 mole % (X-E-X) moieties.

18. The copolymer of claim 1, wherein the chlorotrifluoroethylene:vinyl ether molar ratio X:E is equal to 2.

19. The copolymer of claim 1, having a molar mass from 150 000 to 500 000 g/mol.

* * * * *